No. 707,624. Patented Aug. 26, 1902.
G. A. NILES.
TOOTH FASTENER FOR WEEDERS.
(Application filed June 28, 1902.)
(No Model.)
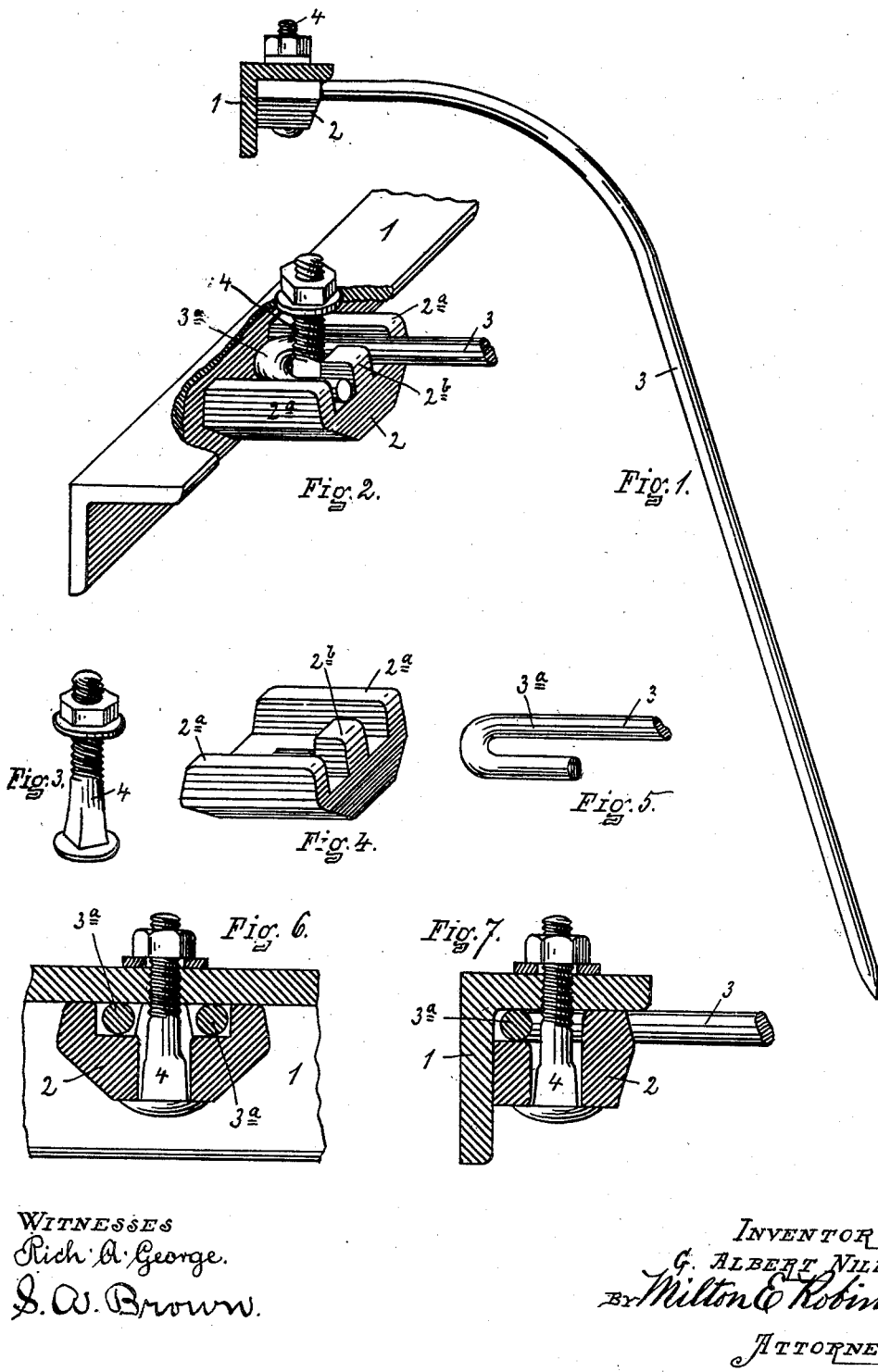
WITNESSES
Rich. A. George.
S. W. Brown.
INVENTOR
G. Albert Niles
By Milton E. Robinson
Attorney.

UNITED STATES PATENT OFFICE.

GEORGE ALBERT NILES, OF UTICA, NEW YORK, ASSIGNOR TO STANDARD HARROW COMPANY, OF UTICA, NEW YORK.

TOOTH-FASTENER FOR WEEDERS.

SPECIFICATION forming part of Letters Patent No. 707,624, dated August 26, 1902.

Application filed June 28, 1902. Serial No. 113,623. (No model.)

*To all whom it may concern:*

Be it known that I, GEORGE ALBERT NILES, of Utica, in the county of Oneida and State of New York, have invented certain new and useful Improvements in Tooth-Fasteners for Weeders; and I do hereby declare that the following is a full, clear, and exact description thereof, which will enable others skilled in the art to which it appertains to make and use the same, reference being had to the accompanying drawings, and to the letters of reference marked thereon, which form part of this specification.

The object of my invention is to provide a tooth-fastener particularly adapted for use with round weeder-teeth which is simple in construction and application and effectually serves the purpose of a tooth-holder.

In the drawings, Figure 1 shows a side elevation of the tooth and fastener in connection with a section of the tooth or frame bar on which the tooth is mounted. Fig. 2 shows a perspective view with a portion of one of the webs of the bar broken out. Fig. 3 shows in perspective the bolt, Fig. 4 the fastener, and Fig. 5 the end of the tooth. Fig. 6 shows a section taken longitudinally of the bar through the plane of the bolt, and Fig. 7 shows a section taken transversely of the bar through the plane of the bolt.

Referring to the reference letters and figures in a more particular description, 1 indicates the tooth-bar, which is angular in form, having a horizontal and a vertical web.

2 is the fastener, having a shoulder at one end adapted to engage with the vertical web of the bar and provided in its upper surface with side walls $2^a$ $2^a$ and an intermediate projection $2^b$, the three forming a recess adapted to receive the U-shaped end $3^a$ of the tooth 3. The fastener 2 is also provided with an opening which receives the bolt 4, by means of which the fastener and tooth are secured to the bar. The bolt is in the plane with the projection $2^b$, and the U-shaped bend on the end of the tooth passes around back of the bolt. The diameter of the material of the tooth at the shank is preferably greater than the depth of the recess in the upper side of the fastener, and the bend or double on the end of the tooth is closely confined between the side of the bolt and the inner face of the vertical web of the bar. When secured by the bolt 4, the shank of the tooth is clamped between the fastener and the under surface of the horizontal web of the bar.

What I claim as new, and desire to secure by Letters Patent, is—

1. The combination in a tooth-fastener of an angle-bar, a tooth having a horizontal, U-shaped bend at its attaching end, the fastener adapted to be applied on the inside of the angle-bar, having a recess opening toward the top to receive the U-shaped end of the tooth and a bolt passing through the fastener, the bend of the tooth and the flange of the angle-bar, substantially as set forth.

2. The combination of the angle-bar, the tooth having the hook-bend on the shank, the fastener having the side walls $2^a$, $2^a$, and the projection $2^b$ and the bolt passing through the fastener, the bend of the tooth and the flange of the angle-bar, substantially as set forth.

In witness whereof I have affixed my signature, in presence of two witnesses, this 14th day of June, 1902.

GEORGE ALBERT NILES.

Witnesses:
J. BENJ. BRADY,
S. A. BROWN.